United States Patent
Lee

(10) Patent No.: US 6,795,432 B1
(45) Date of Patent: Sep. 21, 2004

(54) METHOD FOR SEARCHING COMPOSITE PATH FOR VIRTUAL CONTAINER SIGNALS IN CLOS SWITCHING NETWORK

(75) Inventor: Hong Do Lee, Kyungki-Do (KR)

(73) Assignee: LG Information & Communications, Ltd., Seoul (KR)

( * ) Notice: Subject to any disclaimer, the term of this patent is extended or adjusted under 35 U.S.C. 154(b) by 716 days.

(21) Appl. No.: 09/635,573

(22) Filed: Aug. 9, 2000

(30) Foreign Application Priority Data

Sep. 28, 1999 (KR) .............................. 99-41610

(51) Int. Cl.[7] .............................................. H04L 12/50
(52) U.S. Cl. ...................... 370/388; 370/370; 370/372; 370/238
(58) Field of Search ......................... 370/238, 386–388, 370/369, 370, 372, 907; 340/2.22

(56) References Cited

U.S. PATENT DOCUMENTS

| | | | | |
|---|---|---|---|---|
| 4,394,541 A | * | 7/1983 | Seiden ....................... | 340/2.22 |
| 5,276,425 A | * | 1/1994 | Swanson et al. ........... | 340/2.22 |
| 5,408,231 A | * | 4/1995 | Bowdon ..................... | 340/2.22 |
| 5,504,739 A | * | 4/1996 | Chopping .................... | 370/372 |
| 5,801,641 A | * | 9/1998 | Yang et al. ................. | 340/2.22 |
| 5,864,552 A | * | 1/1999 | Du et al. ..................... | 370/388 |
| 5,987,027 A | * | 11/1999 | Park et al. .................. | 370/360 |
| 6,591,028 B2 | * | 7/2003 | Lin et al. ....................... | 385/16 |
| 6,600,741 B1 | * | 7/2003 | Chrin et al. ................. | 370/375 |

OTHER PUBLICATIONS

ITU–T Recommendation G.707, Network node interface for the synchronous digital hierarchy (SDH), International Telecommunication Union, Series G, Mar. 1996, p. 7–69.*

* cited by examiner

Primary Examiner—Ricky Ngo
Assistant Examiner—Ian N. Moore
(74) Attorney, Agent, or Firm—Fleshner & Kim, LLP

(57) ABSTRACT

Methods for searching a composite path for virtual container signals in a similar CLOS switching network is provided that is capable of switching various signal tributaries. The method can include managing a link use state between each state with a linked list and a bit map, searching connectable candidate paths using the link use state and setting a selected or an optimal path among candidate paths as searched, and managing a connection state of channels in the set path using an N-tree data structure and a data structure.

21 Claims, 12 Drawing Sheets

CHANNEL BEING USED IN CORRESPONDING VC3

VC11:4-1,4-2,4-7,4-4,5-1,5-3,7-1,7-2,7-3
VC12:2-1,2-2,6-1,6-2,6-3

THE SAME MANAGEMENT STRUCTURE from  LINK POINTER FOR 'FROM CHANNEL' to    'START LINK POINTER' FOR 'TO CHANNEL' LIST t     NUMBER OF 'TO CHANNELS' prev  LINK POINTER FOR THE PREVIOUS CHANNEL
      IN CASE THAT A PLURALITY OF
      'TO CHANNELS' EXIST FOR 'FROM CHANNEL' next  LINK POINTER FOR THE NEXT CHANNEL
      IN CASE THAT A PLURALITY OF
      'TO CHANNELS' EXIST FOR 'FROM CHANNEL'

METHOD FOR SEARCHING COMPOSITE PATH FOR VIRTUAL CONTAINER SIGNALS IN CLOS SWITCHING NETWORK

BACKGROUND OF THE INVENTION

1. Field of the Invention

The present invention relates to a CLOS switching network, and more particularly, to a method for searching a composite path for virtual container signals in a CLOS switching network.

2. Background of the Related Art

FIG. 1 shows a related art N×N switch constructed in a single stage. As shown in FIG. 1, the related art N×N switch can be implemented by a single time switch chip that implements a non-blocking connection without forming any additional network. Accordingly, the related art N×N switch can be managed in a simple connection form of 'From channel' and 'To channel', and connection and releasing of a channel is possible by simply managing mutual connection information between the East side and the West side.

As described above, the related art N×N switch has various disadvantages. When a general cross-connection algorithm is applied to the related art N×N switch, it is necessary to form an enormously large-sized single N×N switch by hardware, which is almost impossible. For example, to implement 45×45 switch, approximately 45×45=2025 crosspoint switch arrays are necessary in the single state, which disadvantageously results in increased production cost as well as enlarges the area of the switch itself.

The above references are incorporated by reference herein where appropriate for appropriate teachings of additional or alternative details, features and/or technical background.

SUMMARY OF THE INVENTION

An object of the present invention is to provide a method for searching implementing a non-blocking cross-connection in a multi-stage CLOS switching network that substantially obviates one or more problems caused by disadvantages in the related art.

Another object of the present invention is to provide a method for searching a composite path for virtual container signals that performs and manages a non-blocking cross-connection in a multi-stage, i.e., three-stage, similar CLOS switching network.

Another object of the present invention is to provide a method for determining a path for signals in a CLOS switching network that can switch various signal tributaries.

Another object of the present invention is to provide a method for searching a composite path for virtual container signals in a multi-stage CLOS switching network that is capable of mixing a VC3 and a VC11 and a VC12 for mapping.

Another object of the present invention is to provide a method for searching a composite path for virtual container signals in a multi-stage CLOS switching network that is capable of searching and managing a composite path for virtual container signals and of performing a cross-connection.

To achieve these and other advantages in a whole or in part and in accordance with the purposed of the present invention, as embodied and broadly described herein, there is provided a method for searching a composite path for virtual container signals in a multi-stage similar CLOS switching network that includes managing a link use state between each state with a linked list and a bit map, searching connectable candidate paths on the basis of link use state and setting a selected path among candidate paths as searched, and managing a connection state of channels in the set path by using an N-tree data structure.

To further achieve the above-described objects of the present invention in a whole or in parts, there is provided a method for searching a composite path for virtual container signals in a multi-stage CLOS switching network that includes managing a link use state between each stage, searching connectable candidate paths on the basis of the link use state and setting a selected path among candidate paths after searching, and managing a channel connection state of the set path.

To further achieve the above-described objects of the present invention in a whole or in parts, there is provided a method for searching a composite path for virtual container signals in a multi-stage CLOS switching network that includes managing a link use state between each stage with a linked list and a bit map, and setting a candidate path on the basis of a use state of a corresponding link and setting a selected VC3 and VC11/VC12 path among the candidate paths as set, wherein, the bit map includes a VC3 Flag and Counter representing the link use state when a corresponding link is a VC3 level signal path, and representing a number of TUG-2 groups being currently used when the corresponding link is a hybrid DS3 level signal path, TUG-2 group pointers representing a channel stage of seven TUG-2 groups of the link used as the hybrid DS3 path, and TUG-2 Usage information representing a use state of the seven TUG-2 groups.

To further achieve the above-described objects of the present invention in a whole or in parts, there is provided a data structure for a multi-stage CLOS switching network that includes a bit map, wherein the bit map that includes a VC3 Flag and Counter representing a link use state, TUG-2 group pointers representing a channel state of seven TUG-2 groups of the link to be used as a hybrid DS3 mode, and TUG-2 Usage information representing a use state of the seven TUG-2 groups, and a linked list structure, wherein the linked list has a node structure with depth equal to a number of stages in the multi-stage plus one (1), and wherein each node structure includes a node ID having an ordered stage number, a switch number and a channel number for differentiating each node, a forward counter and forward pointer each representing a connection to a next stage, a backward pointer representing a connection from a previous stage, and a next pointer and a previous pointer representing a broadcast connection and a relation of sibling nodes, respectively, and wherein a link use state between each stage is represented by the linked list and the bit map.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings which like reference numerals refer to like elements wherein.

DETAILED DESCRIPTION OF PREFERRED EMBODIMENTS

Figure 1:
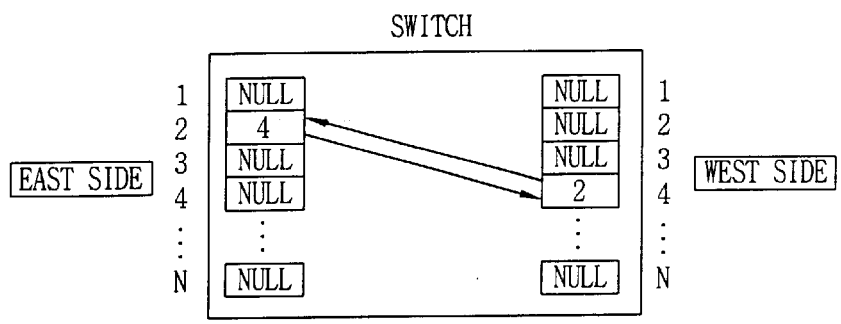
FIG. 1 is a diagram that illustrates an N×N switch constructed in a single structure in accordance with the related art.
Figure 2:
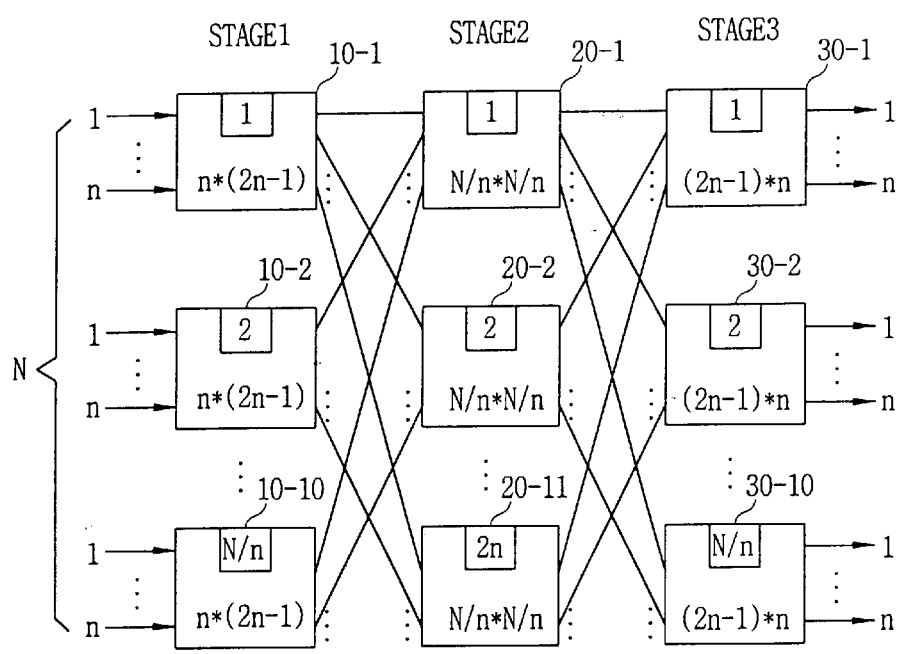
FIG. 2 is a diagram that illustrates a structure of an exemplary similar CLOS switching network adapted to the present invention.

Reference will now be made in detail to the preferred embodiments of the present invention, examples of which are illustrated in the accompanying drawings. FIG. 2 is a diagram that illustrates a structure of an exemplary Common LISP Object System (CLOS) switching network according to the present invention. As shown in FIG. 2, a CLOS switching network is formed in a 3-stage switching structure for constructing a N×N non-blocking switch, having N number of inputs and N number of outputs.

For example, assuming that N=60 and n=6, 60 inputs are divided into groups having 6 inputs and 60 outputs are divided into groups having 6 outputs. Accordingly, stage 1 includes N/n (=60/6) number of switches (10-1, ..., 10-10) each having nx(2n−1)(=6×11) number of crosspoint switches. Stage 2 includes 2n—1(=11) number of switches (20-1, ..., 20-11) each having N/nxN/n(=10×10) number of cross point switches. Stage 3 includes N/n(=60/6) switches each having (2n−1)xn(=11×6) number of crosspoint switches.

Thus, the total number of the crosspoint switches required for the CLOS switching network is 10×(6×11)+11×(10×10)+10×(11×6)=2420, which is reduced by 33% relative to the number of the crosspoint switches, that is, 60×60=3600, required for the related art single N×N switch.

Path connection between each stage in the CLOS switching network is preferably previously defined. That is, the first output of the second switch 10-2 of the stage 1 is coupled to the second input of the first switch 20-1 of the stage 2, and the second output of the first switch 20-1 of the stage 2 is coupled to the first input of the second switch 30-2 of the stage 3. The 'CLOS switching network' signifies that 'If' this condition is satisfied, it is a switch that can implement the non-blocking connection.

In preferred embodiments according to the present invention, in the CLOS switching network, each path is set to receive a single VC3 level signal, or to receive 21 VC12 level signals and 28 VC11 level signals, or 22–27 VC11/VC12 level signals. Accordingly, the switching network as shown in FIG. 2 adapted according to the present invention may be defined as "a similar CLOS network".

Each switch of the similar CLOS network as shown in FIG. 2 should satisfy the non-blocking structure for all of the every switching interface signal unit (VC3, VC11 and VC12). For this purpose, a state management and a path setting process are required. In this respect, the state management refers to a management over whether a channel is in use or not and its connection state by each switching interface signal unit.

A structure of the similar CLOS switching network will now be described.

Each switch in the similar CLOS switching network in accordance with preferred embodiments of the present invention satisfies the condition of the CLOS switching network for the VC3 level signal (e.g., N=288, n=12), and has following characteristics.

Characteristics of each switch module will now be described.

Figure 3:
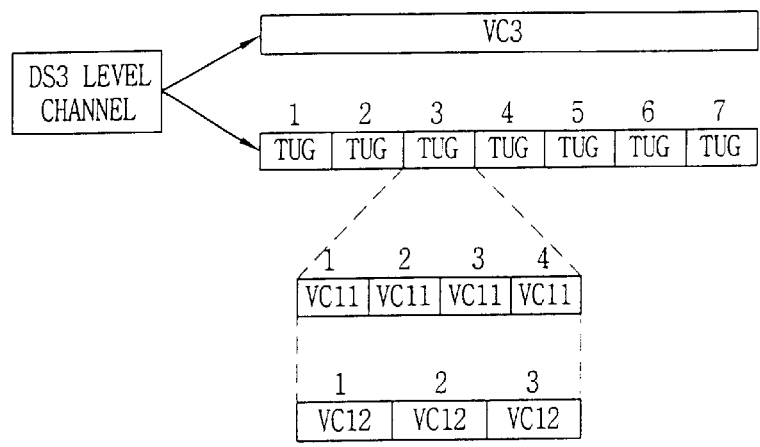
FIG. 3 is a diagram that illustrates a structure of a channel in use for a path for a DS3-level signal or a hybrid DS3-level signal in accordance with the present invention.

The switches (switch modules) of each stage freely perform connections of every input and output channel for the VC11, VC12 and the VC3 level signals (e.g., a time switching and a space switching). Further, as shown in FIG. 3, the VC11 level signal or the VC12 level signal can not be used in the path that is set for the VC3 level signal and is being used by it. Seven tributary unit group -2 (TUG-2) can be accepted for the path in use for a hybrid digital signal (level) 3 (DS3) level signal, and each TUG-2 can be constructed by a channel of 3×VC12 or a channel of 4×VC11. In this respect, each TUG-2 can be used with either one of the 3×VC12 mode or the 4×VC11 mode, but it can not be used by mixing them.

Characteristics of switch connection between each stage will now be described.

In the similar CLOS switching network, the output paths of the switches (10-1, ..., 10-10) of the stage 1 are coupled to every switch (20-1, ..., 20-11) of the stage 2, and the output paths of the switches (20-1, ..., 20-11) of the stage 2 are coupled to every switch (30-1, ... 30-10) of the stage 3. In this respect, the paths from the input to the output as coupled by the above-mentioned characteristics are the same in number as the switches of the stage 2.

A process for setting a path for connecting the input and output channels and a method for managing same according to preferred embodiments of the present invention will now be described.

For the purpose of setting a path, a use state of all the links positioned between the first stage and the second stage and a use state of all the links between the second stage and the third stage should be recognized. By knowing the use state of every link, candidate paths that are actually selectable can be arranged, and the most suitable or optimum path can be selected among the candidate paths.

An ID for connection link between stages will now be described.

The connection links between the first stage and the second stage are called input stage links, and the connection links between the second stage and the third stage are called output stage links. In this respect, since the same link may be differently called at the position of the stage 1 and at the position of the stage 2 when an ID is given to each link, a link ID is given on the basis of the stage 1 and the stage 3 as follows:

Connection link ID ={input|output}-{stage 1 switch#|stage 3 switch #}-{output or input VC3 #of switch}.

Figure 4:
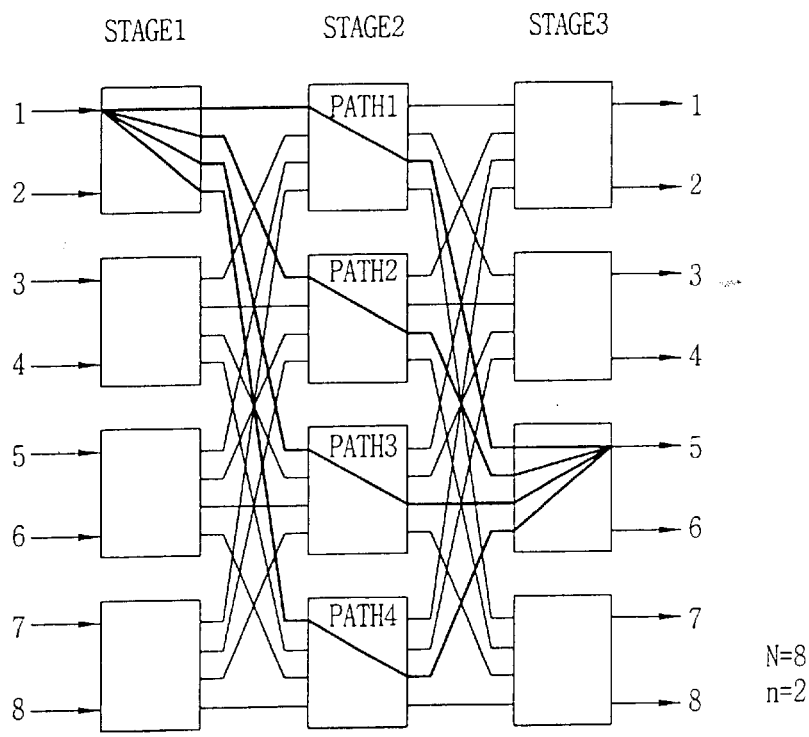
FIG. 4 is a diagram that illustrates connection paths of a channel selectable in the similar CLOS switching network of FIG. 2 in accordance with the present invention.

Accordingly, as shown in FIG. 4, the first path can be expressed to go by way of a link of an input-1-1 and an output-3-1, and the second path can be expressed to go by way of an input-1-2 and an output-3-2. The third path can be expressed to go by way of a link of an input-1-3 and an output-3-3, and the fourth path can be expressed to go by way of an input-1-4 and an output-3-4.

A method for managing state information for using each link will now be described.

Figure 6A:
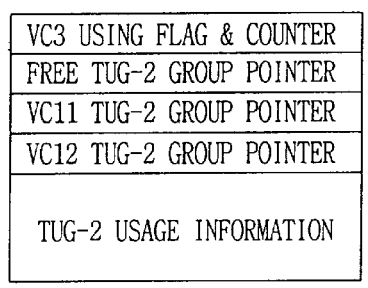
FIGS. 6A and 6B are diagrams that illustrate a data structure and a bit map showing a managing structure of link use information in accordance with preferred embodiments according to the present invention.
Figure 6B:
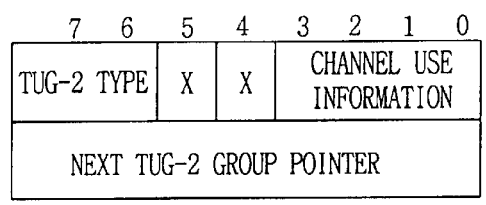

Each link of the input and output stages is classified to the following three states and processed by a bit map as shown in FIG. 6B according to preferred embodiments. First, a state that links are not being used. Second, a state that a link is being used for the connection of a signal of a clear DS3 mode or an unframed DS3 mode, that is, the connection of the VC3 level signal. Third, a state that a link is being used for the connection of the hybrid DS3 level signal, that is, the connection of the VC11 level signal or to the VC12 level signal. In other words, referring to the management structure of the use of links as shown in FIG. 6A according to preferred embodiments, the value of the VC3 using flag & counter is set as 0 (idle) or 0xff to represent the first and second states, and in case that a link is used for the connection of the VC11 level signal or the VC12 level signal, the VC3 Using Flag & Counter is operated as a counter to thereby represent a count value (T1-7) of the TUG-2 group that is being currently used.

Figure 5:
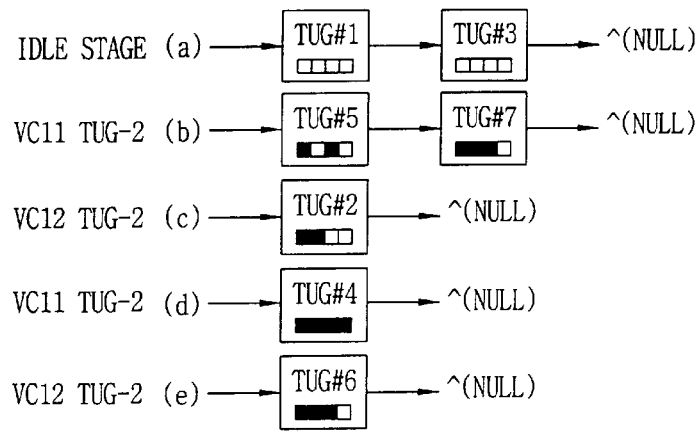
FIG. 5 is a diagram that illustrates a link used in the hybrid DS3 mode of FIG. 2 in accordance with preferred embodiments according to the present invention.

For example, as shown in FIG. 5 according to preferred embodiments, since five TUG-2 groups except the TUG#1 and TUG#3 are used, the count value is '5'

The seven TUG-2 group unit within the link to be used as the hybrid DS3 mode is preferably managed with a linked list using an array. That is, as shown in FIG. 5, the channel states of each TUG-2 group can be classified to the following five states. First, a state (a) that a TUG type (VC11 or VC12) are not determined yet (idle state). Second, a state (b) that a TUG type was determined as 4×VC11 for use and there remained channels that are not in use. Third, a state (c) that a TUG type was determined as 3×VC12 for use and there remained channels that are not in use. Fourth, a state (d) that a TUG type was determined as 4×VC11 for use and there is no more available channel for use, and fifth, a state (e) that a TUG type was determined as 3×VC12 for use and there is no more available channel for use.

The TUG-2 s being in each state (i.e., (a)–(e)) can be differentiated by the link to where an information unit of each TUG-2 belongs. That is, respective information in the states of (a), (b) and (c) is managed by using a Free TUG-2 group pointer, a VC11 TUG-2 group pointer and a VC12 TUG-2 group pointer as shown in FIG. 6A. In this respect, the Free TUG-2 group pointer of FIG. 6A becomes the 'TUG#1' as shown in FIG. 5, the VC11 TUG-2 group pointer of FIG. 6A becomes the 'TUG#5' as shown in FIG. 5, and the VC12 TUG-2 group pointer of FIG. 6A becomes the 'TUG#2' as shown in FIG. 5.

In case of the states of (d) and (e), information of a corresponding TUG-2 group is separated from the link so that it can be excluded when channels are allocated afterward. Accordingly, when the TUG-2 group being in the state of (a) is determined as VC11 type or the VC12 type for use, the TUG-2 group in the (a) state is connected to the link pointer of the states (b) or (c). Meanwhile, when the TUG-2 group being in the state of (b) or (c) is all used and there remains no available channel, the TUG-2 group is separated from the link pointer of the (b) or (c) state and moved to the respective (d) or (e) state. When disconnection is required for a corresponding path in the state of (d) or (e) later and the channel is not used, the corresponding TUG-2 group is connected to the link pointer being in the state of (b) or (c).

A state of use of three VC12 or four VC11 channels in each TUG group is expressed by the TUG-2 Usage information. The TUG-2 Usage information, having a structure as shown in FIG. 6B, is defined for every TUG-2 group. As shown in FIG. 5, seven pieces of TUG-2 Usage information (TUG#1~TUG#7) are defined.

In this respect, a 2 bit TUG-2 type represents one of a non-use state (00B or 11B), or VC11 (01B) or VC12 (10B), and a 4 bit channel use information represents a state of use of each channel of each TUG-2 group. That is, referring to FIG. 5, in case of TUG#5, the 4 bit channel use information is represented by '1010', in case of TUG#2, it is represented by '1100', and in case of TUG#4, it is represented by '1111'.

As shown in FIG. 6B, the Next TUG-2 group pointer represents a pointer of the next TUG-2 group to be connected to the Free TUG-2 group pointer, the VC11 TUG-2 group pointer and the VC12 TUG-2 group pointer. That is, in case of TUG#1 and TUG#5 of FIG. 5, the Next TUG-2 group pointers represent TUG#3 and TUG#7, respectively.

In this manner, the state of use of each channel of the input stage and the output stage and the state of seven TUG-2 groups to be used for connection of the hybrid DS3 level signal are preferably stored in the database (DB) to be managed.

A method for managing a connection state for the set paths according to preferred embodiments will now be described.

A set path is preferably defined as four channel allocations from the input channel of the stage 1 to the output channel of the stage 3 and their connection state. The connection structure of a corresponding path is to be available for searching from 'From channel' to 'To channel' and vice versa, and to support a broadcast connection, it is to be available for connection from single 'From channel' to a plurality of 'To channels'. The 'To channel' of the broadcast connection can be set at maximum as much as its capacity is allowed.

Figure 7A:
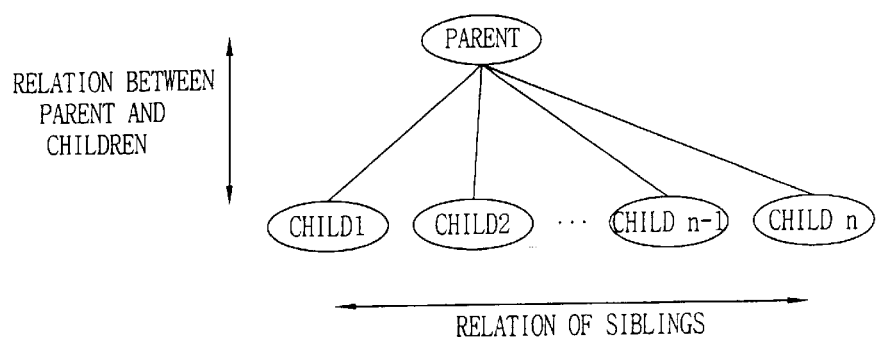
FIGS. 7A and 7B are diagrams that illustrate a logic structure of an N-tree for managing a connection state of paths as set and a data structure of the corresponding N-tree in accordance with preferred embodiments according to the present invention.
Figure 7B:
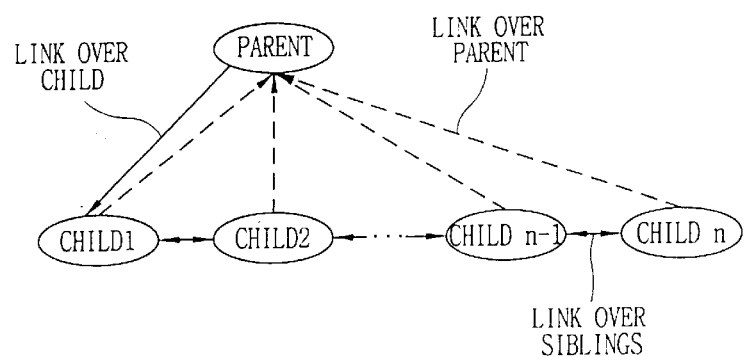

In accordance with preferred embodiments of the present invention, in order to manage the set path, the N-tree logic structure is preferably used as shown in FIGS. 7A and 7B. The connection state between the stage 1 and the stage 2 can be expressed by a relation of a parent node and children nodes. The stage 1 is a parent node, and the stage 2 is a children node. The switches (20-1, . . . , 20-11) of the stage 2 are in a sibling relation to each other.

Connection between the parent node and the children node preferably has a doubly linked list structure, that is, as shown in FIG. 7B, the parent node has a link to the children node, and the plurality of children nodes (CHILD1, . . . CHILDn) have a link to the parent node, respectively. The children nodes (CHILD1, . . . CHILDn) has a link of sibling to each other.

Figure 8:
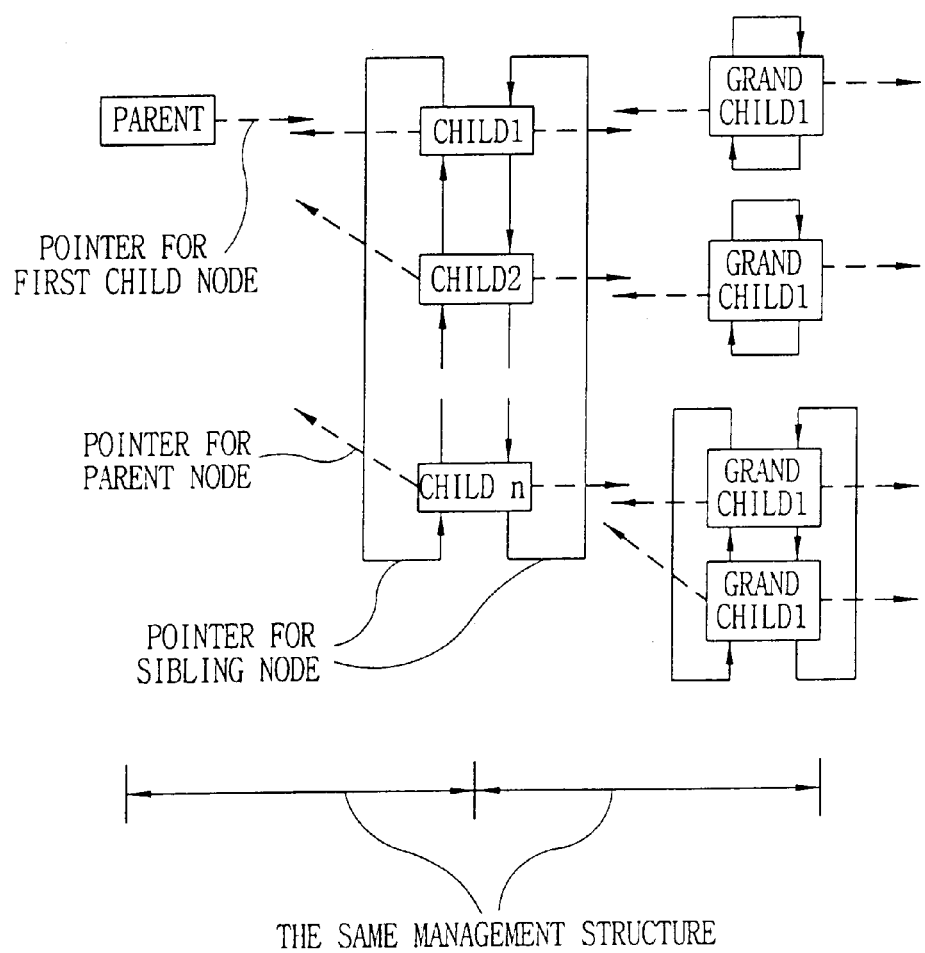
FIG. 8 is a diagram that illustrates a data structure of managing a connection state of the channel of FIG. 2 in accordance with preferred embodiments according to the present invention.

Depending on the number of switches constructing the stage, the children nodes reach n number at its maximum. As n becomes large, it is difficult for the parent node to manage all of the pointers of the children nodes. Accordingly, as shown in FIG. 8 according to preferred embodiments, the parent node preferably has a pointer for only one child node (e.g., CHILD1) among the children nodes, and obtains pointers of other children (e.g., CHILD2, . . . CHILDn) from the selected child node.

The sibling link forming connection between the children nodes (CHILD1, . . . CHILDn) preferably employs a circular doubly linked list structure in which insertion and deletion are easily performed and abnormalities of links are easily determined. The data structure between the children nodes and grandchildren nodes preferably has the same form as that between the parent node and the children nodes to maintain a consistent process. Although, the present invention is not intended to be so limited.

Figure 9:
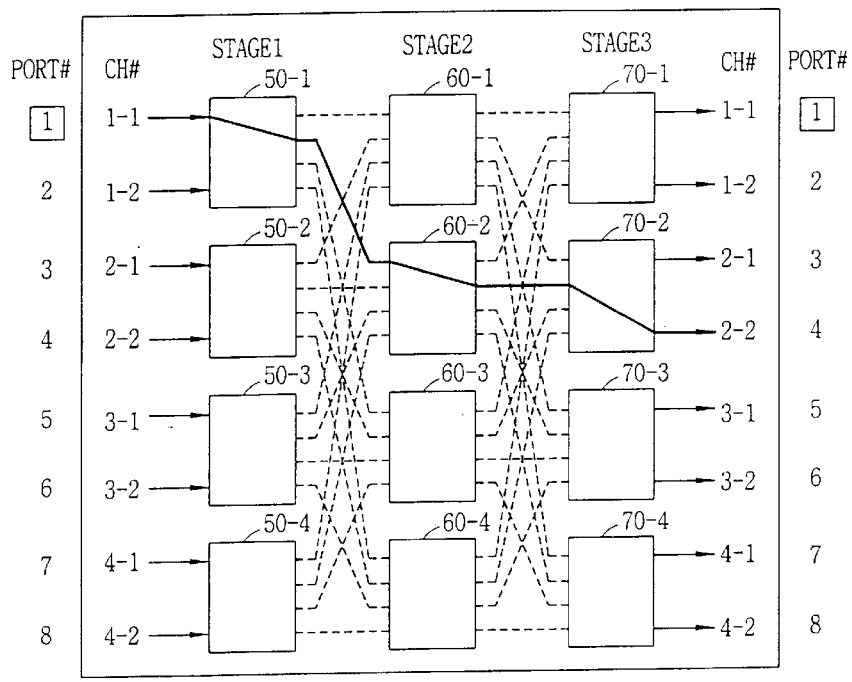
FIG. 9 is a diagram that illustrates an example of a one-way cross-connection of FIG. 2 in accordance with preferred embodiments according to the present invention.

FIG. 9 illustrates an example of one-way cross-connection (port 1→port 4) in the similar CLOS switching network according to preferred embodiments of the present invention. As shown in FIG. 9, the set path is noted to be started from the input 1(1-1) of the stage 1, passes through the output 2 of the switch (50-1) included in the stage 1 and the input 2 of the switch (70-2) included in the stage 3 and is connected to the output 2 of the switch (70-2) included in the stage 3.

In order to represent the channel connection state of the set path, an ID (stage number+switch number+channel number) is necessary to differentiate each node.

Figure 10:
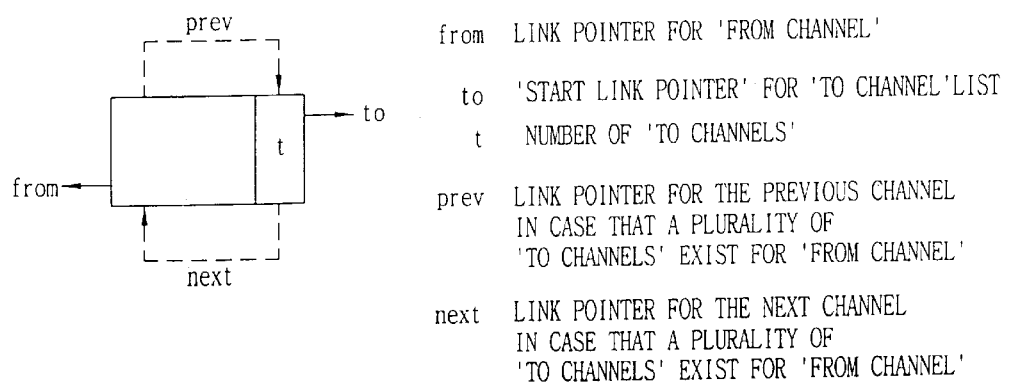
FIG. 10 is a diagram that illustrates a data structure of a node showing a connection state of a channel in accordance with preferred embodiments according to the present invention.

Also, as shown in FIG. 10 according to preferred embodiments, a node structure of 'To counter (t)' and 'To pointer (to)' representing a connection to the next stage, a 'From pointer (from)' representing a connection from the previous stage, a next pointer (next) and a previous pointer (prev) can represent a broadcast connection.

Figure 11:
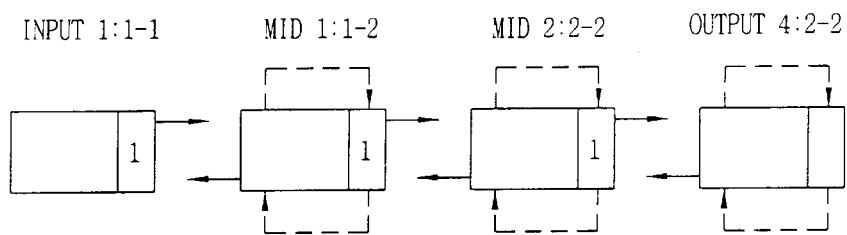
FIG. 11 is a diagram that shows an example of a management of a connection state for the one-way cross-connection of FIG. 9 in accordance with preferred embodiments according to the present invention.

Accordingly, when the node structure as shown in FIG. 10 is applied to the one-way cross-connection of FIG. 9, a form as shown in FIG. 11 can be obtained. To differentiate the nodes, when the input terminal of the stage 1 is defined as 'Input', the stage between the stage 1 and the stage 2 is defined as 'Mid1, the stage between the stage 2 and the stage 3 is defined as 'Mid2', and the output terminal of the stage 3 is defined as 'Output'. Thus, each ID of each node can be expressed by Input 1: 1-1, Mid 1:1-2, Mid 2: 2-2 and Output 4: 2-2.

Since the input terminal is not connected to the previous stage, it is only expressed by 'To counter '1'' and 'To pointer (→)' representing the connection to the next stage, and Midi and Mid2 are expressed by 'To counter 1'', 'To pointer (→)' and 'From pointer (←)' representing the connection from the previous state. Since the output terminal is not connected to the next stage, it is expressed only by 'From pointer (←)' representing the connection from the previous stage. In case of the one-way cross-connection, one piece of channel linkage information is connected by a 1:1 connection from the input stage to the output stage.

Figure 12:
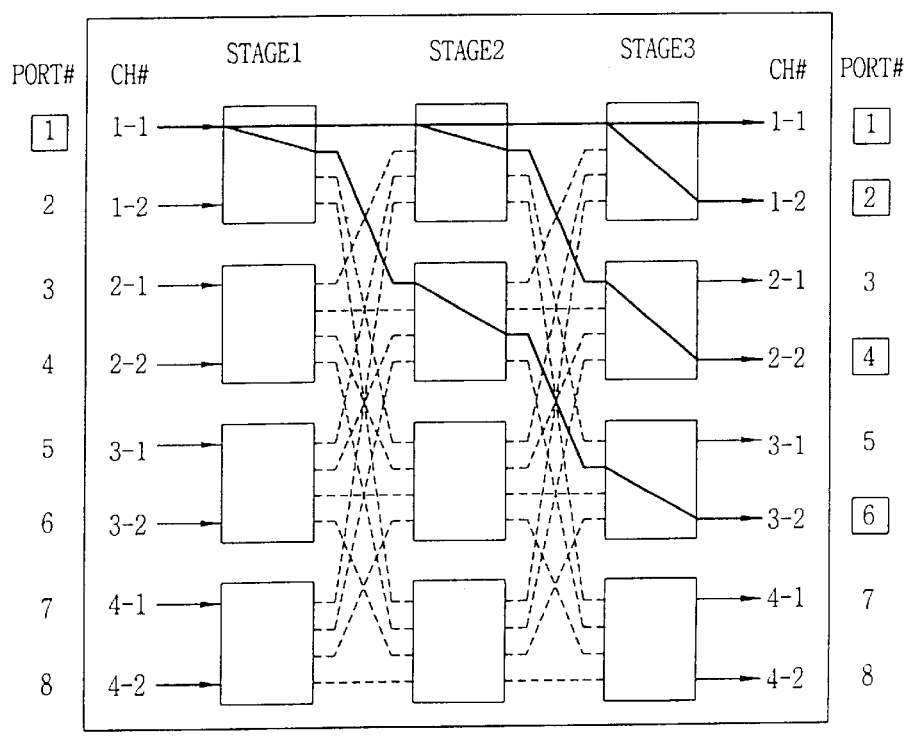
FIG. 12 is a diagram that shows an example of a broadcast cross-connection of FIG. 2 in accordance with preferred embodiments according to the present invention.
Figure 13:
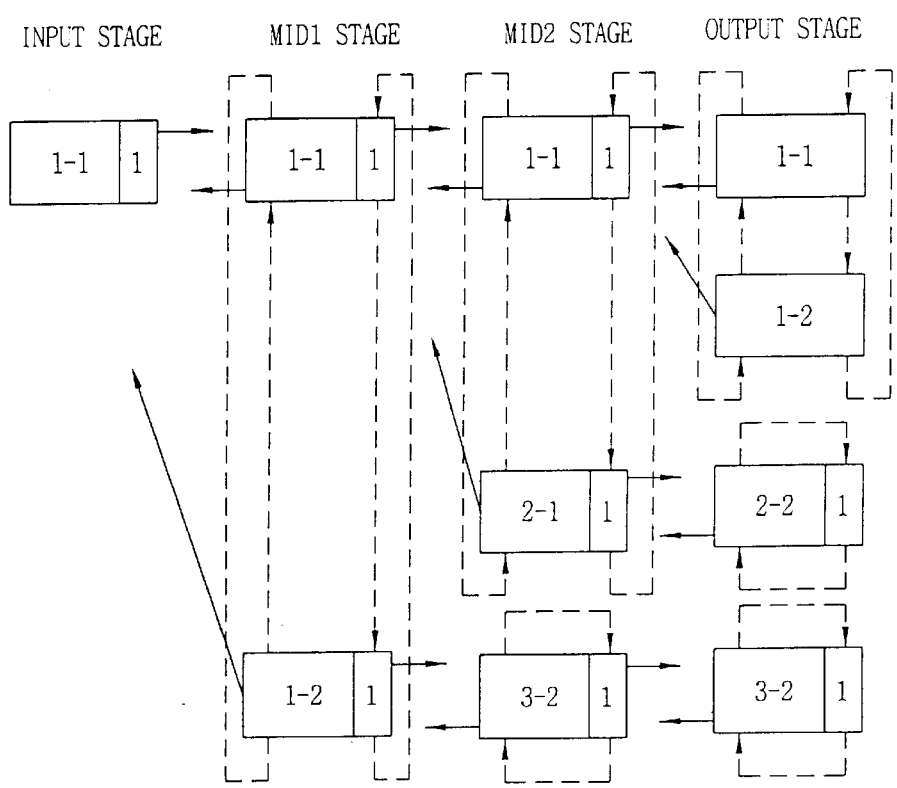
FIG. 13 is a diagram that shows an example of a management of a connection state for the broadcast cross-connection of FIG. 12 in accordance with preferred embodiments according to the present invention.

FIG. 12 illustrates an example of the broadcast connection in the similar CLOS switching network according to preferred embodiments of the present invention. As shown in FIG. 11, the broadcast connection includes three forms that a path is divided in the stage 1, in the stage 2 and in the stage 3, which are respectively expressed by a 1:n connection. Accordingly, when the data structure of FIG. 7 and the node structure of FIG. 10 are applied to the broadcast connection of FIGS. 11–12, a form of tree-like structure as shown in FIG. 13 can be formed.

That is, the 1-1 (switch-channel) node of the input stage becomes a parent node having sub-trees of 1-1 and 1-2 of the Mid 1 stage, and the 1-1 of the Mid 1 stage becomes a parent node having sub-trees of 1-1 and 1-2 of the Mid 2 stage. Also, 1-1 of the Mid 2 stage becomes a parent node having sub-trees of 1-1 and 1-2 of the output stage. Management unit of the channel connection stage in the form as described above may be the VC3, VC11 and VC12.

A method for setting a path according to preferred embodiments of the present invention will now be described.

As described above, in the similar CLOS switching network, the switch modules should be available for cross-connection over the VC3, VC11 and VC12. In this respect, in order to allocate a path for the VC3 level signal, any of the VC11 level channel or VC12 level channel should not be allocated in a link of a candidate path for the VC3.

Accordingly, in preferred embodiments of the present invention, in case that a path for the VC11 channel or the VC12 channel is allocated, a link that the VC11 level channel and VC12 level channel were already allocated is used when possible to increase an efficiency of channel usage. Using the method of channel allocation prevents most blocking when the VC3 path is set, but it does not fundamentally solve the problem of blocking. Blocking may be an unavoidable problem, because the VC3 level signal and the VC11 or VC12 path are processed together in the similar CLOS switch network. Thus, if such a problem occurs, it is typically solved by resetting a path for the VC11 or the VC12.

Figure 14:
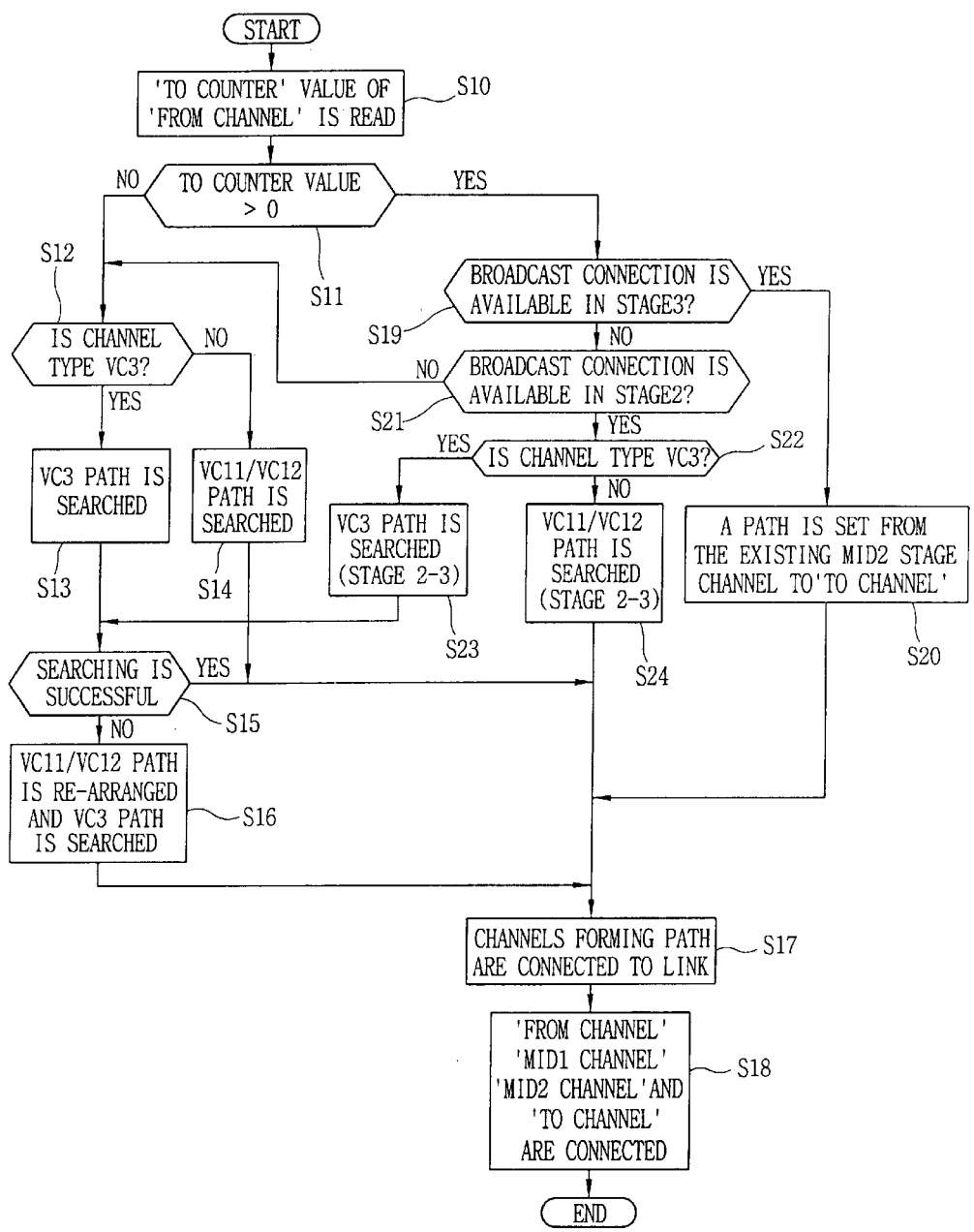
FIG. 14 is a signal flow chart that shows a preferred embodiment of a method for searching a composite path for virtual container signals in the similar CLOS switching network in accordance with the present invention.

FIG. 14 is a flow chart that illustrates a preferred embodiment of a method for searching a composite path in the similar CLOS switching network according to the present invention. In the similar CLOS switching network adapted to the preferred embodiments according to the present invention, the switches are in a limited condition in that they must satisfy the non-blocking structure for all of the internal switching interface signal units (VC11, VC12 and VC3), for which an appropriate state management and a process or algorithm for setting a path are necessary. The state management signifies management that checks whether any channel is in use or not by each switching interface signal unit, and a connection state.

The requirement for setting a path in the similar CLOS switching network may be defined as 'setting a path from an input channel to an output channel in a designated channel type', for which a path should be set between the stage 1 and the stage 2 and the stage 2 and the stage 3. At this time, whether a channel is in use or not between the two stages recognizes whether a corresponding channel is available for use, and a path determined through a path identifying process is managed according to a connection state of the channels forming the corresponding path.

In case that a disconnection for a corresponding path is required by receipt of an input channel and an output channel of a later-designated channel type, a channel connection state management searches the channels forming the corresponding path and then releases their connection state and use state. Undoubtedly, for the setting of such a path, a correlativity and exclusiveness between the switch interface signal units (VC11, VC12 and VC3) should be considered and an effective channel use policy needs to be selected.

As shown in FIG. 14, a process preferably starts when a channel type, the number of 'From channel' (input channel) and the number of 'To channel' (output channel), that is, a requirement for setting a path, are inputted, and continues to step S10 where the 'To counter' value of the 'From channel' is read. From step S10 control continues to step S11 where it is determined whether the 'To counter' value of the 'From channel' is greater than '0'. That is, the 'To counter' value of the 'From channel' is determined so as to identify whether there already exists a path to the 'To channel' at step S11. If the 'To counter' value of the 'From channel' is greater than '0', control jumps to step S19 because it is determined that there already exists a path and an operation for broadcast connection is performed. If the 'To counter' value of the 'From channel' is '0'in step S11, control continues to step S12 to perform an operation for a one-way cross-connection.

Figure 15:
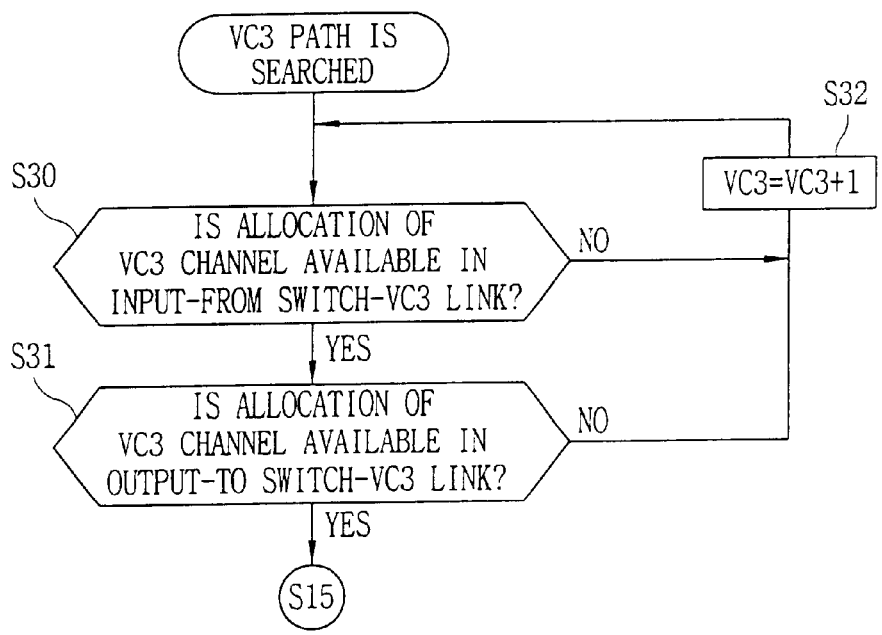
FIG. 15 is a flow chart showing a preferred embodiment of a method for searching the VC3 path of FIG. 14 in accordance with the present invention.
Figure 16:
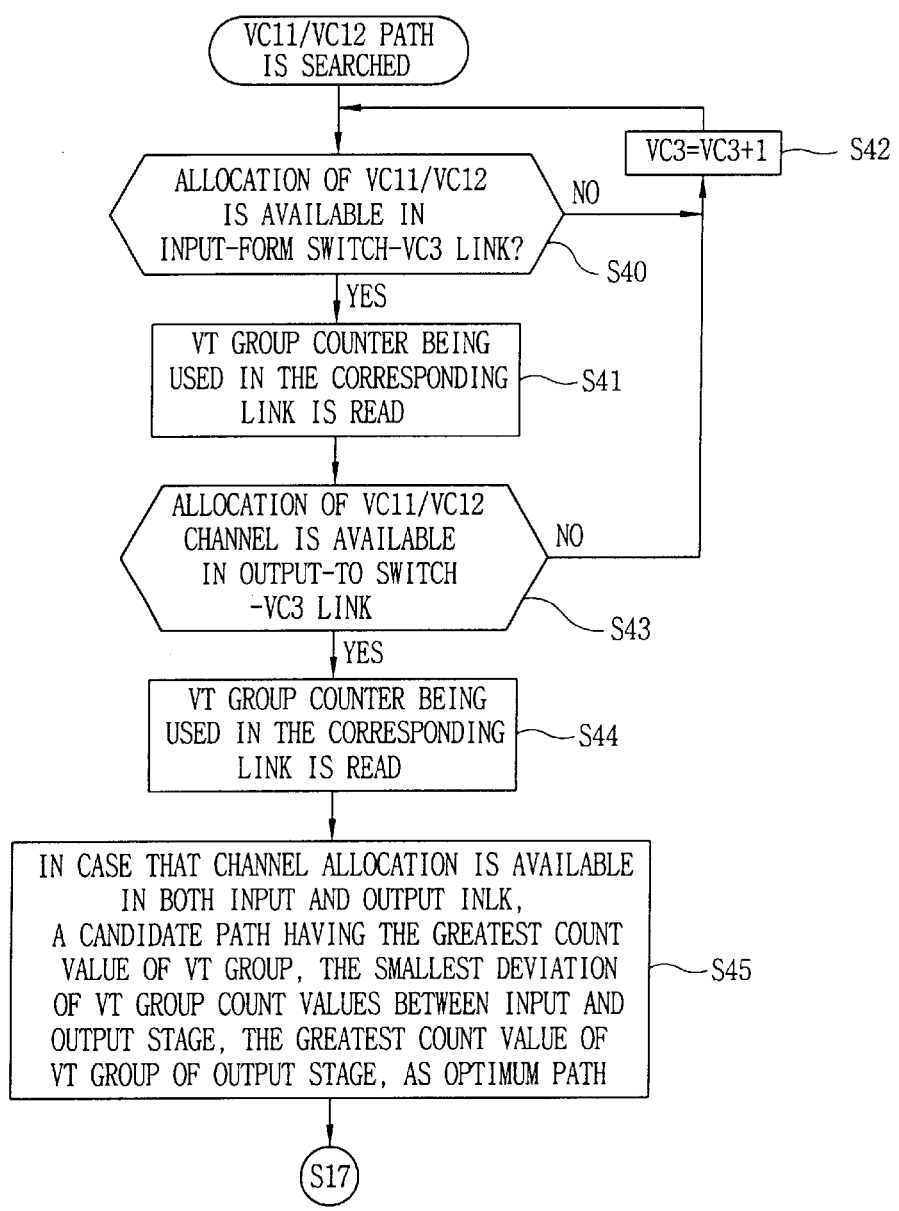
FIG. 16 is a flow chart showing a preferred embodiment of a method for searching the VC11/VC12 path of FIG. 14 in accordance with the present invention.

For the one-way cross-connection, first, a signal tributary desired for setting a path is discriminated and processed, respectively. Accordingly, the process preferably checks whether a type of the channel inputted as a requirement for setting the path is VC3 at step S12. If the channel type is the VC3, the process continues to step S13 to perform searching the VC3 path, for example, as shown in FIG. 15. However, if the channel type is not determined to be VC3 in step S12 (e.g., the channel type is VC11 or VC12), the process jumps to step S14 to perform searching the VC11 or VC12 path, for example, as shown in FIG. 16.

As shown in FIG. 15, a preferred embodiment of a process for evaluating the VC3 path according to the present invention will now be described. In the process of searching the VC3 path in step S13, the VC3 links (e.g., 24 VC3 links) are sequentially searched to identify whether the VC3 channel can be allocated to each VC3 link between the stage 1 and the stage 2, and between the stage 2 and the stage 3. In this respect, the possibility of the allocation of the VC3 channel is preferably judged on the basis of a flag of the VC3 Using Flag & Counter (idle: 0).

That is, since input stage link is between the stage 1 and the stage 2 and output stage link is between the stage 2 and the stage 3, control continues to step S30 in which a first check determines whether the VC3 channel can be allocated in the Input-from switch-VC3 link. If so, control continues to step S31 in which a second check determines whether the VC3 channel can be allocated in the Output-to switch-VC3 link. Upon checking, if the determination in steps S30 and S31 is negative because the VC3 channel is not able to be allocated in the VC3 link, control jumps to step S32 where the VC3 channel is increased one by one, and control returns to step S30 to repeat the VC3 channel allocation checks. If the VC3 channel can be allocated in step S31, the process preferably searches any connectable candidate paths and returns to step S13.

If there exist candidate paths and searching the paths is determined to have been performed successfully, control continues to step S15, in which a candidate path that was first searched is preferably selected. In this case, control continues to step S17 to connect the channels forming the selected path to the link, and the VC3 level 'From channel', Mid 1 channel, Mid 2 channel and 'To channel' are connected by using the selected path at step S18. From step S18, the process ends.

As shown in FIG. 16, a preferred embodiment of a process for evaluating the VC11/VC12 path according to the present invention will now be described. In the process of searching the VC11/VC12 path in step S14, the VC3 links (e.g., 24 VC3 links) are sequentially searched to identify whether the VC11/ the VC12 channel can be allocated to each VC3 link between the stage 1 and the stage 2, and between the stage 2 and the stage 3. In this respect, the availability of the allocation of the VC11/VC12 channel is preferably judged upon reading the TUG-2 Usage information as shown in FIG. 6A.

From the step of searching the VC11/VC12 path, control continues to step S40 where it is determined whether the VC11/VC12 channel can be allocated in the input link (Input-from switch—VC3 link) and searches connectable candidate paths at step S40.

If the VC11/VC12 channel can be allocated in step S40, control continues to step S41 where a count value of a Virtual Tributary (VT) group is read, that is, the VC3 Using Flag & Count value as shown in FIG. 6A from a database. (DB), being used for the corresponding VC3 link, and identifies the frequency of usage of the corresponding VC3 link. On the other hand, if the VC 11 and VC12 channels are not able to be allocated in step S40, control returns to step S40 after increasing the VC3 link one by one at step S42.

Subsequently, from step S41 control continues to step S43 where it is determined whether the VC11/VC12 channel can be allocated in the output link (Output-to switch-VC3 line) and connectable candidate paths are searched.

If the VC11/VC12 channel can be allocated in step S43, control continues to step S44 where a count value of the VT group being used for the corresponding VC3 link is read from the DB. However, if the VC11/VC12 channel is not to be allocated in step S43, control jumps to step S42 and the above described steps are repeated after increasing the VC3 link one by one at step S42.

From step S44, control continues to step S45 where upon identifying, in case that the input link and the output link are all possible for channel allocation, a candidate path is selected, as an optimum or preferred path, that has the greatest count value of the VT group, the smallest deviation of the count values of the VT group between the input link and the output link, and the greatest count value of the VT group in the output link, and control continues to steps S17 and S18. However, if the candidate path does not exist, and thus, searching the path is failed at step S15, control continues to step S16 where re-arranging the VC11/VC12 paths and searching the VC3 path are performed.

Figure 17:
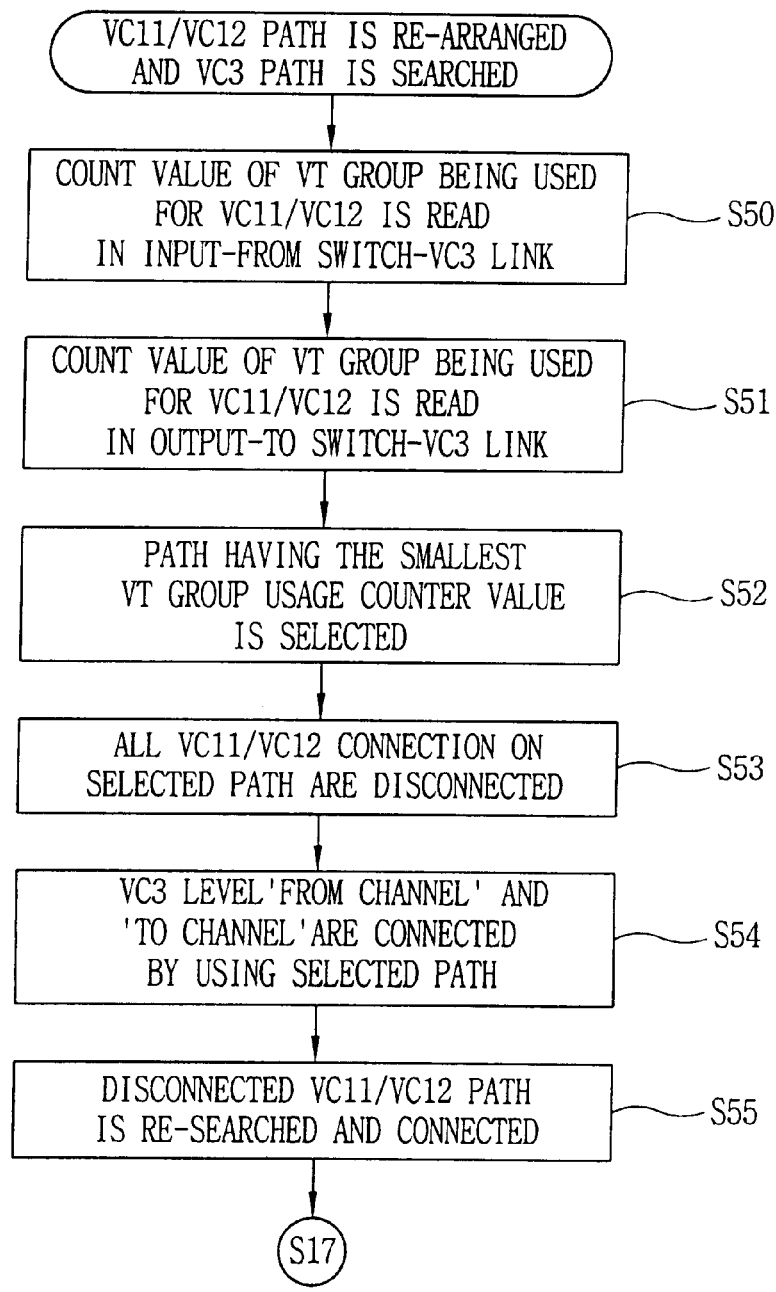
FIG. 17 is a flow chart showing a preferred embodiment of a method for re-arranging the VC11/VC12 path and searching the VC3 path of FIG. 14 in accordance with the present invention.

As shown in FIG. 17, a preferred embodiment of a process where the V11/V12 path is rearranged and the VC3 path is searched will now be described. In the process of re-arranging the VC11/VC12 paths and searching the VC3 path, control continues to steps S50 and S51, where each count value of the VT group being used for the VC11 /VC12 in the input link (Input-from switch-VC3 link) and the output link (Input-to switch-VC3 link) from the DB is read, and a path that has the smallest count value of the VT group both in the two links is then selected at step S52.

From step S52, control continues to step S53 where every VC11/VC12 connection on the selected path is disconnected. From step S53, control continues to step S54 where the VC3 level 'From channel' and 'To channel' are connected by using the selected path. From step S54, control continues to step S55 where the disconnected VC11/VC12 path is again searched preferably by using the process of step S14 of searching the VC11/VC12 for connection described above at step S55.

The case that the searching a path is failed as the candidate path does not exist at step S15 falls to the case that blocking occurred by spreading of the VC11/VC12 . Thus, in this case, preferably the most suitable path for re-arrangement is selected, every VC11/VC12 path on the selected path is released, the VC3 path is set on the corresponding path, and the VC11/VC12 path is re-set.

For the purpose of the broadcast connection, control jumps from step S11 to step S19 where it is determined whether a broadcast connection is available in the stage 3. As shown in FIG. 12, if the broadcast connection is determined to be available in the stage 3, control continues to step S20 where only a path from the existing Mid 2 stage (1-1 of Mid 2 stage) to the 'To channel' (1-1 or 102 of the output stage) is set. However, if the broadcast connection is not available in the stage 3, control continues to step S21 where it is determined whether a broadcast connection is available in the stage 2.

If the broadcast connection is determined in step S21 to be available in the stage 2, control continues to step S22 where it is determined whether the channel type inputted as a requirement for setting a path is a VC3. If the broadcast connection is not available in the stage 2, while being available in the stage 1, control continues from step S21 to perform the steps after step S12.

At step S22, when the channel type is the VC3, control continues to step S23 where the VC3 path is searched and then performs the steps after step S15. When the channel type is the VC11/VC12 , control continues from step S22 to step S24 where the VC11/VC12 path is searched and then control continues to step S17. At this time, at the step S23 of searching the VC3 path and the step S24 of searching the VC11/VC12 path, it is checked whether the VC3 channel can be allocated between the stage 2 and the stage 3, that is, the output link (Output-to switch-VC3 link), and especially, at the VC11/VC12 path searching step S24 selects a candidate path having greater count value of the VT group of the output stage as a preferred or an optimum path among candidate paths.

As so far described, in the similar CLOS switching network having three stages, it is checked whether the channels are in use or not using each switching interface signal (VC11 , VC12 and VC3) and its connection state is managed. When there is a request for setting a path, the preferred embodiments can identify whether each channel is in use or not between the stage 1 and the stage 2, and between the stage 2 and the stage 3, according to which a path is set.

As described above, the preferred embodiments of a CLOS switching network and methods for operating the same according to the present invention have various advantages. In the preferred embodiments according to the present invention, the VC3 signal and the VC11/VC12 signals can be mixed to be switched (mapped), and the cross-connection can be more effectively performed and managed. Also, when the path for the VC11 or the VC12 channel is set, the existing link for which the VC11 and VC12 level channels are already allocated is used, so that efficiency of use of channels can be increased. In addition, in case where blocking occurs due to the spreading of the VC11/VC12 , after every VC11/VC12 connection on the selected path is disconnected, the VC3 path is set on the corresponding path and the VC11/VC12 path is reset, so that the non-blocking cross-connection can be more effectively implemented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for searching a composite path for virtual container signals in a multi-stage CLOS switching network, comprising:

managing a link use state between each stage;

searching connectable candidate paths on the basis of the link use state and setting a selected path among candidate paths after searching; and managing a channel connection state of the set path wherein the setting the selected path comprises, receiving a channel type, a start channel number and a destination channel number for setting the path, identifying a first signal of the start channel to identify whether there is an existing path to the destination channel number, discriminating the channel type to perform one-way cross-connection, and performing a first VC3 path searching step or a first VC11/VC12 path searching step to set the path when the existing path does not exist, discriminating an available stage for broadcast connection from an output stage to an input stage so as to perform the broadcast connection when the existing path exists, and performing a second VC3 path searching step or a second VC11/VC12 path searching step in the discriminated stage to set the path.

2. The method according to claim 1, wherein the managing the link use state between each stage uses a linked list and a bit map, wherein the bit map comprises:

a VC3 Flag and Counter representing the link use state;

TUG-2 group pointers representing a channel state of TUG-2 groups of the link to be used as a hybrid DS3 mode; and TUG-2 Usage information representing a use state of the TUG-2 groups.

3. The method according to claim 2, wherein the VC3 Flag and Counter represents a use state of the link as a path for a VC3 level signal, and wherein the VC3 Flag and Counter counts a number of the TUG-2 groups currently being used as the path for the hybrid DS3 level signal.

4. The method according to claim 2, wherein each of the TUG-2 group pointers comprises:

a Free TUG-2 group pointer representing non-use TUG-2 group;

a VC11 TUG-2 group pointer used in a VC11 type to represent a TUG-2 group where there remains a non-used channel; and a VC12 TUG-2 group pointer used in a VC12 type to represent the TUG-2 group where there remains a non-used channel.

5. The method according to claim 2, wherein the TUG-2 Usage information comprises:
   a TUG-2 type field representing one of a non-use state, a VC11 channel and a VC12 channel;
   a channel use information field representing a use state of channels of each of the TUG-2 groups; and
   a Next TUG-2 group pointer field representing a pointer of a next TUG-2 group to be connected to the TUG-2 group pointers.

6. The method according to claim 1, wherein the managing the channel connection state of the set path has an N-tree structure, wherein the multi-stage CLOS network has three stages, wherein the N-tree data structure represents a first connection state between a stage 1 and a stage 2 as a relation of a parent node and a child node, a second connection state between the stage 2 and a stage 3 as a relation of the child node and a grandchild node, and children nodes and grandchildren nodes in the stage 2 and stage 3, respectively, have a sibling node relation to each other.

7. The method according to claim 6, wherein the first connection state between the parent node and the children nodes has a doubly linked list structure, and wherein a connection between the sibling nodes has a circular doubly linked list structure.

8. The method according to claim 7, wherein the parent node has a pointer for only one child node among the children nodes and obtains pointers of other children from the one child node.

9. The method according to claim 6, wherein the second connection state between the children node and the grandchildren nodes has a doubly linked list structure, and wherein a connection between the sibling nodes has a circularly doubly linked list structure.

10. The method according to claim 1, wherein the managing the channel connection state of the set path uses an N-tree data structure, wherein the data structure is a node structure with depth equal to a number of stages in the multi-stage plus one (1), and wherein each node structure comprises:
   a node ID having an ordered stage number, a switch number and a channel number for differentiating each node;
   a forward counter and forward pointer each representing a connection to a next stage;
   a backward pointer representing a connection from a previous stage; and
   a next pointer and a previous pointer representing a broadcast connection and a relation of sibling nodes, respectively.

11. The method according to claim 1, wherein the first VC3 path searching step comprises:
   checking whether the VC3 channel can be allocated in the VC3 link of the input link and the output link, and respectively searching a connectable candidate path; and
   selecting the first searched candidate path as the selected path being the VC3 path when the channels can be allocated both in the two links.

12. The method according to claim 11, further comprising rearranging the VC11/VC12 path and setting the VC3 path, if there is no candidate path, wherein the step of rearranging the VC11/VC12 path and setting the VC3 path comprises:
   reading a count value of a Virtual Tributary (VT) group being used for the VC11/VC12 by the input link and the output link, respectively;
   selecting a path having the smallest count value of the VT group in both of the two links;
   disconnecting every existing VC11/VC12 connection on the selected path and connecting the VC3 level start channel number and destination channel number on the selected path; and
   performing the VC11/VC12 searching step for the disconnected VC11/VC12 path for re-connection.

13. The method according to claim 1, wherein the first VC11/VC12 path searching step comprises:
   sequentially checking whether the VC11/VC12 channel can be allocated in the VC3 link of the input link and the output link;
   reading a count value of a VT group being used in the corresponding link and searching candidate paths when the VC11/VC12 channel can be allocated to the VC3 link; and
   selecting the selected path based on the VT group among the candidate paths as searched.

14. The method according to claim 13, wherein the selected path is the candidate path that has a largest first count value of the VT group in the input link, a largest second count value of the VT group in the output link and a smallest deviation of the count values of the VT group between the input link and the output link.

15. The method according to claim 1, wherein the second VC3 path searching step comprises:
   checking whether the VC3 channel can be allocated in the VC3 link of the output link and searching connectable candidate paths; and
   selecting the first searched candidate path as the selected path being the VC3 path when the channels can be allocated in the output link.

16. The method according to claim 1, wherein the second VC11/VC12 path searching step comprises:
   sequentially checking whether the VC11/VC12 channel can be allocated in the VC3 link of the output link;
   reading a count value of the VT group being used in the corresponding link and searching a candidate path when the VC11/VC12 channel can be allocated to the VC3 link; and
   selecting a candidate path having a greater count value of the VT group as the selected path among the candidate paths as searched.

17. A method for searching a composite path for virtual container signals in a multi-stage CLOS witching network, comprising:
   managing a link use state between each stage with a linked list and a control information; and
   setting a candidate path on the basis of a use state of a corresponding link and setting a selected VC3 and VC11/VC12 path among the candidate paths as set, wherein, the control information comprises,
      a VC3 Flag and Counter representing the link use state when a corresponding link is a VC3 level signal path, and representing a number of TUG-2 groups being currently used when the corresponding link is a hybrid DS3 level signal path,
      TUG-2 group pointers representing a channel stage of a set of TUG-2 groups of the link used as the hybrid DS3 path, and
      TUG-2 Usage information representing a use state of the the set of TUG-2 groups.

18. The method according to claim 17, wherein each of the TUG-2 group pointers comprises:
- a Free TUG-2 group pointer representing non-use TUG-2 group;
- a VC11 TUG-2 group pointer used in a VC11 type to represent a TUG-2 group where there remains a non-used channel; and
- a VC12 TUG-2 group pointer used in a VC12 type to represent the TUG-2 group where there remains a non-used channel.

19. The method according to claim 17, wherein the TUG-2 Usage information comprises:
- a TUG-2 type field representing one of a non-use state, a VC11 channel and a VC12 channel;
- a channel use information field representing a use state of channels of each of the TUG-2 groups; and
- a Next TUG-2 group pointer field representing a pointer of the next TUG-2 group to be connected to the TUG-2 group pointers.

20. The method according to claim 17, wherein the linked list represents a connection state between each adjacent stage by a doubly linked list of the relation between a parent node and children nodes, and wherein the children nodes in the same stage are represented by a circular doubly linked list.

21. The method according to claim 20, wherein the linked list is a node structure with depth equal to a number of stages in the multi-stage plus one (1) and a degree is variable represent the channel connection state, wherein each node structure comprises:
- a node ID having an ordered stage number, a switch number and a channel number for differentiating each node;
- a forward counter and a forward pointer each representing a connection to a next stage;
- a backward pointer representing a connection from a previous stage; and
- a next pointer and a previous pointers representing a broadcast connection and a relation of sibling nodes, respectively.

* * * * *